(12) United States Patent
O'Donnell et al.

(10) Patent No.: US 8,392,359 B2
(45) Date of Patent: Mar. 5, 2013

(54) TREND ANALYSIS BASED UPON DERIVED STATE TABLES

(75) Inventors: Tony O'Donnell, Kildare Town (IE); Louay Gargoum, Dublin (IE)

(73) Assignee: Business Objects Software Ltd., Dublin (IR)

( * ) Notice: Subject to any disclaimer, the term of this patent is extended or adjusted under 35 U.S.C. 154(b) by 368 days.

(21) Appl. No.: 12/539,525

(22) Filed: Aug. 11, 2009

(65) Prior Publication Data

US 2011/0040723 A1 Feb. 17, 2011

(51) Int. Cl.
G06F 7/00 (2006.01)
G06F 17/00 (2006.01)
G06Q 10/00 (2012.01)

(52) U.S. Cl. ...................... 707/603; 705/7.11
(58) Field of Classification Search .................. None
See application file for complete search history.

(56) References Cited

U.S. PATENT DOCUMENTS

| | | | | | |
|---|---|---|---|---|---|
| 4,873,623 | A | * | 10/1989 | Lane et al. | 700/83 |
| 5,745,750 | A | * | 4/1998 | Porcaro | 1/1 |
| 5,752,002 | A | * | 5/1998 | Naidu et al. | 703/14 |
| 6,473,794 | B1 | * | 10/2002 | Guheen et al. | 709/223 |
| 7,917,606 | B2 | * | 3/2011 | Dettinger et al. | 709/221 |
| 2005/0114409 | A1 | | 5/2005 | Sinha et al. | |

FOREIGN PATENT DOCUMENTS

WO WO 2007/106331 9/2007

OTHER PUBLICATIONS

Huling, A Process for Better, Faster Software Reviews Mar. 29, 1999, Diciplined Softare Consulting, Chapter 7: State Transition Tables.*
Turing, On computable numbers, with an application to the Entscheidungsproblem (and correction thereof) 1937, Proceedings of the Longdon Mathematical Society, Ser. 2, vol. 42-43, http://www.turingarchive.org/browse.php/B/12.*
Esper Reference Documentation 2007, EsperTech, Ver 1.12.0, i - 150.*
Moon, Bongki et al., "Spatiotemporal Aggregate Computation: A Survey", IEEE Transactions on Knowledge and Data Engineering, Feb. 1, 2005, pp. 271-286, vol. 17, No. 2, Los Alamitos, CA, US.

* cited by examiner

Primary Examiner — Jason Liao
(74) Attorney, Agent, or Firm — Mintz, Levin, Cohn, Ferris, Glovsky and Popeo, P.C.

(57) ABSTRACT

A computer readable storage medium includes executable instructions to analyze a query associated with a report to identify query clauses. The query is applied against a data source that does not have a specified time dimension. An optimized audit log is formed from an existing audit log to store data changes of interest at the data source and temporal values associated with the data changes, where each data change corresponds to a query clause. A state table is constructed to specify the state of each query clause. Records in the optimized audit log are processed by temporal value to produce updated state tables. Transition tables are derived from the updated state tables to associate temporal values with data changes at the data source that impact a result produced by the query. Trend data is then supplied from the transition tables.

13 Claims, 6 Drawing Sheets

| Transaction ID | Record ID | Table Name | Field Name | Old Value | New Value | Modification Date |
|---|---|---|---|---|---|---|
| 1 | 1 | Employees | Profession | Asst. Engineer | Engineer | t |
| 2 | 2 | Employees | Nationality | FR | UK | t-1 |
| 3 | 2 | Employees | Industry | Marine | Auto | t-1 |
| 4 | 3 | Employees | Profession | Engineer | Manager | t-2 |

FIG. 5

| Record ID | Profession | Nationality | Industry | State | Active |
|---|---|---|---|---|---|
| 1 | Engineer | FR | Aerospace | 1 | 1 |
| 2 | Engineer | UK | Auto | 0 | 1 |
| 3 | Manager | FR | Aerospace | 0 | 1 |
| 4 | Engineer | FR | Aerospace | 1 | 1 |

FIG. 6

| Record ID | Profession | Nationality | Industry | State | Active |
|---|---|---|---|---|---|
| 1 | Asst. Engineer | FR | Aerospace | 0 | 1 |
| 2 | Engineer | UK | Auto | 0 | 1 |
| 3 | Manager | FR | Aerospace | 0 | 1 |
| 4 | Engineer | FR | Aerospace | 1 | 1 |

FIG. 7

| Transaction ID | Record ID | TIME |
|---|---|---|
| 1 | 1 | t |

FIG. 8

| Record ID | Profession | Nationality | Industry | State | Active |
|---|---|---|---|---|---|
| 1 | Asst. Engineer | FR | Aerospace | 0 | 1 |
| 2 | Engineer | FR | Auto | 0 | 1 |
| 3 | Manager | FR | Aerospace | 0 | 1 |
| 4 | Engineer | FR | Aerospace | 1 | 1 |

FIG. 9

| Record ID | Profession | Nationality | Industry | State | Active |
|---|---|---|---|---|---|
| 1 | Asst. Engineer | FR | Aerospace | 0 | 1 |
| 2 | Engineer | FR | Auto | 0 | 1 |
| 3 | Manager | FR | Aerospace | 0 | 1 |
| 4 | Engineer | FR | Aerospace | 1 | 1 |

FIG. 10

| Record ID | Profession | Nationality | Industry | State | Active |
|---|---|---|---|---|---|
| 1 | Asst. Engineer | FR | Aerospace | 0 | 1 |
| 2 | Engineer | FR | Auto | 0 | 1 |
| 3 | Engineer | FR | Aerospace | 1 | 1 |
| 4 | Engineer | FR | Aerospace | 1 | 1 |

FIG. 11

| Transaction ID | Record ID | TIME |
|---|---|---|
| 4 | 3 | t-2 |

FIG. 12

| Time | Population | Leavers | Joiners |
|---|---|---|---|
| t | 2 | 0 | 1 |
| t-1 | 1 | 0 | 0 |
| t-2 | 2 | 1 | 0 |

FIG. 13

TREND ANALYSIS BASED UPON DERIVED STATE TABLES

FIELD OF THE INVENTION

This invention relates generally to the analysis of stored data. More particularly, this invention relates to computerized trend analysis based upon derived state tables.

BACKGROUND OF THE INVENTION

Business Intelligence (BI) generally refers to software tools used to improve decision-making. These tools are commonly applied to financial, human resource, marketing, sales, customer and supplier analyses. More specifically, these tools can include: reporting and analysis tools to present information, content delivery infrastructure systems for delivery and management of reports and analytics, data warehousing systems for cleansing and consolidating information from disparate sources, and data management systems to collect, store, and manage raw data.

A data warehouse is a repository of an organization's electronically stored data. Data warehouses are designed to facilitate Business Intelligence operations. A data warehouse is typically formed by an Extract, Transform and Load (ETL) process in which data from a source (e.g., a transactional database) is extracted, transformed (e.g., for data standardization or quality control) and loaded into a target (i.e., the data warehouse).

Historical trends provide a powerful source of information on prior business performance, and a potential guide to future behaviour. Business Intelligence systems often analyze historical trends using data warehouses that can be queried against a time dimension. While this provides a basis for analysis, it is limited by the quality of the data that is available, which is often delayed or out of date. It also requires the existence of an explicitly defined time dimension.

Traditional ETL and data warehouse systems do not support agile ad hoc query or report creation. Conventional reporting systems require that an expert design a warehouse; this requires that there is clear prior knowledge of the quantities to be tracked. For example, if a user wants to track the number of staff at a particular grade within an organization, it is useful to know how many were new to that grade in a given month, and how many moved on during the same period. This could be further extended by identifying where the movers went.

Consider the example of a human resource director who wants to know about the career progression of staff over a period of years. In particular, the director wants to know how many people are promoted on an annual basis and what the turnover of staff is at each grade. Existing tools can be used to create a report that shows overall values, such as titles and number of employees for each title. It would be desirable to be able to select a title (e.g., "Engineer") and request monthly totals for the previous two years. Ideally, this would result in a new panel showing a month-by-month breakdown of the number of employees at the Engineer grade in each month, as well as the numbers leaving and joining that grade. Ideally, one would then be able to find information on those leaving the grade to identify the most likely reasons for moving, e.g. how many were promoted to Senior Engineer, how many left the company, etc.

This information on numbers being promoted could then be feed back into a performance management system, where it could be used to set targets for annual reviews with a view to identifying how many staff should be promoted year by year. Alternatively, it could be used to set recruitment targets.

Thus, it would be desirable to have a tool for the optimized creation of periodic, historic reports where there is no explicitly defined time dimension. Such a tool should utilize real-time data sources, such as transactional databases and work with audit logs to reconstruct an historical view in an efficient manner. The tool should support cumulative or non-cumulative data. More particularly, it would be desirable to provide a mechanism for tracking changes in a result set between time periods in order to identify turnover of members and their origins or destinations outside the result set.

SUMMARY OF THE INVENTION

A computer readable storage medium includes executable instructions to analyze a query associated with a report to identify query clauses. The query is applied against a data source that does not have a specified time dimension. From a suitable log of changes, an optimized log is formed to store data changes of interest at the data source and temporal values associated with the data changes. A state table is constructed to specify the state of each unique data item required by the query. Records in the optimized log are processed by temporal value to produce updated state tables. Transition tables are derived from the updated state tables to associate temporal values with data changes at the data source that impact a result produced by the query. Trend data is then supplied from the transition tables.

BRIEF DESCRIPTION OF THE FIGURES

The invention is more fully appreciated in connection with the following detailed description taken in conjunction with the accompanying drawings, in which:

FIG. 5 illustrates an audit log configured and processed in accordance with an embodiment of the invention.

FIG. 6 illustrates a state table processed in accordance with an embodiment of the invention.

FIG. 7 illustrates changes made to the state table of FIG. 6.

FIG. 8 illustrates a transition table (e.g., a Joiner table) formed in accordance with an embodiment of the invention.

FIG. 9 illustrates a change made to the state table of FIG. 7.

FIG. 10 illustrates an intermediate state of the state table.

FIG. 11 illustrates changes made to the state table of FIG. 10.

FIG. 12 illustrates a transition table (e.g., a Leaver table) formed in accordance with an embodiment of the invention.

FIG. 13 illustrates trend data supplied in accordance with an embodiment of the invention.

Like reference numerals refer to corresponding parts throughout the several views of the drawings.

DETAILED DESCRIPTION OF THE INVENTION

Providing a trend analysis over time is not difficult in a system that explicitly defines time periods in which the data of interest is true, relevant or the like. For example, if a system specifies begin and end dates of a record of interest, a time aware report can be created using existing resources. The present invention is directed toward the case in which no such explicit time dimension exists. Instead, time based reporting is facilitated by reconstructing historical states using existing audit logs.

Figure 1:
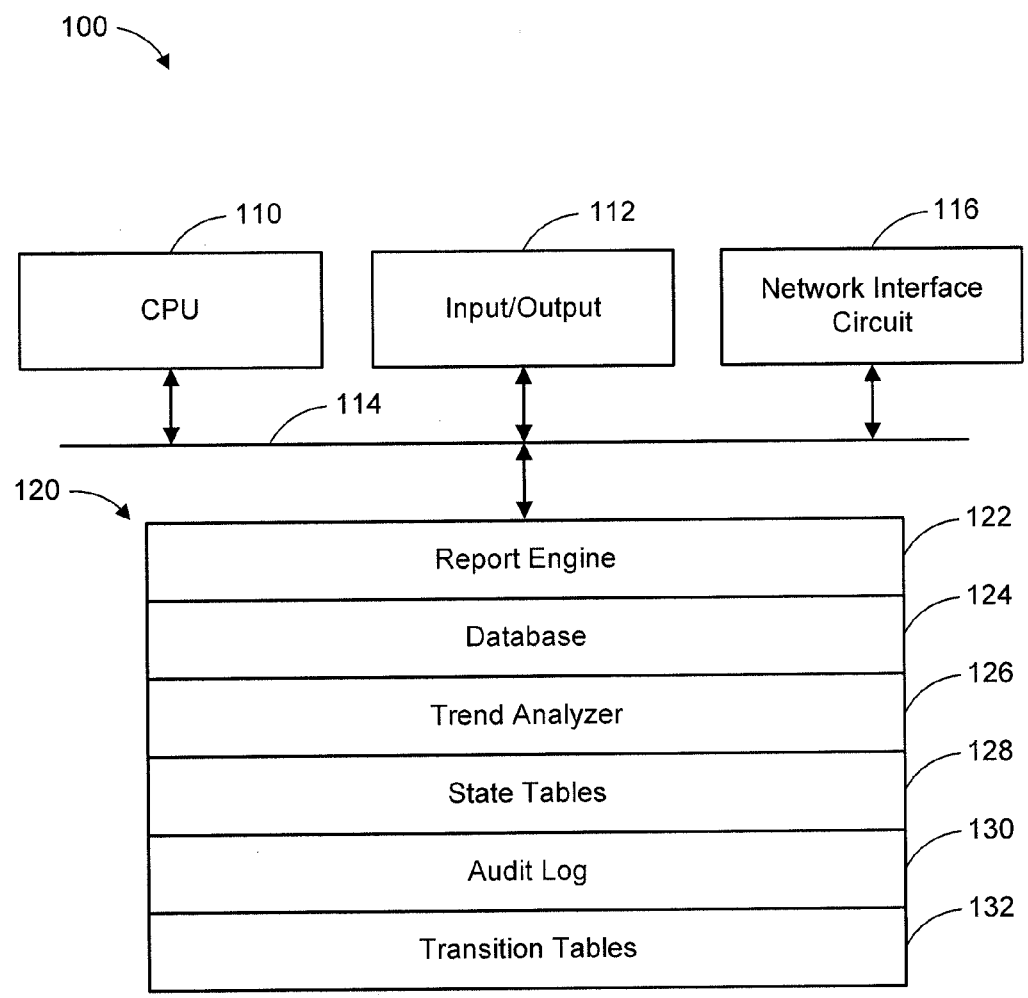
FIG. 1 illustrates a computer configured in accordance with an embodiment of the invention.

FIG. 1 illustrates a computer 100 configured in accordance with an embodiment of the invention. The computer 100 includes standard components, such as a central processing unit 110 and input/output devices 112 connected via a bus 114. The input/output devices 112 may include a keyboard, mouse, display, printer and the like. A network interface circuit 116 may also be connected to the bus 114 to provide connectivity to a network (not shown).

A memory 120 is also connected to the bus 114. The memory 120 stores executable instructions to implement operations of the invention. For example, the memory 120 may store a standard report engine 122 to produce a report. As used herein, the term report refers to information automatically retrieved (i.e., in response to computer executable instructions) from a data source (e.g., a database, a data warehouse, a plurality of reports, and the like), where the information is structured in accordance with a report schema that specifies the form in which the information should be presented. In this example, the report engine 122 accesses the database 124 to produce a report. The database 124 is a non-temporally explicit data source, such as an Online Transaction Processing (OLTP) database.

The standard report engine 122 is supplemented with a trend analyzer 126 that implements operations of the invention. The trend analyzer 126 includes executable instructions to derive trend information from a non-temporally explicit data source. The executable instructions of the trend analyzer 126 may include instructions to produce state tables 128, an audit log 130 and transition tables 132, examples of which are discussed below. The trend analyzer 126 processes the state tables 128, audit log 130 and transition tables 132 to provide trend information. This stands in contrast to conventional approaches that rely upon an explicitly defined time dimension to provide trend information.

Figure 2:
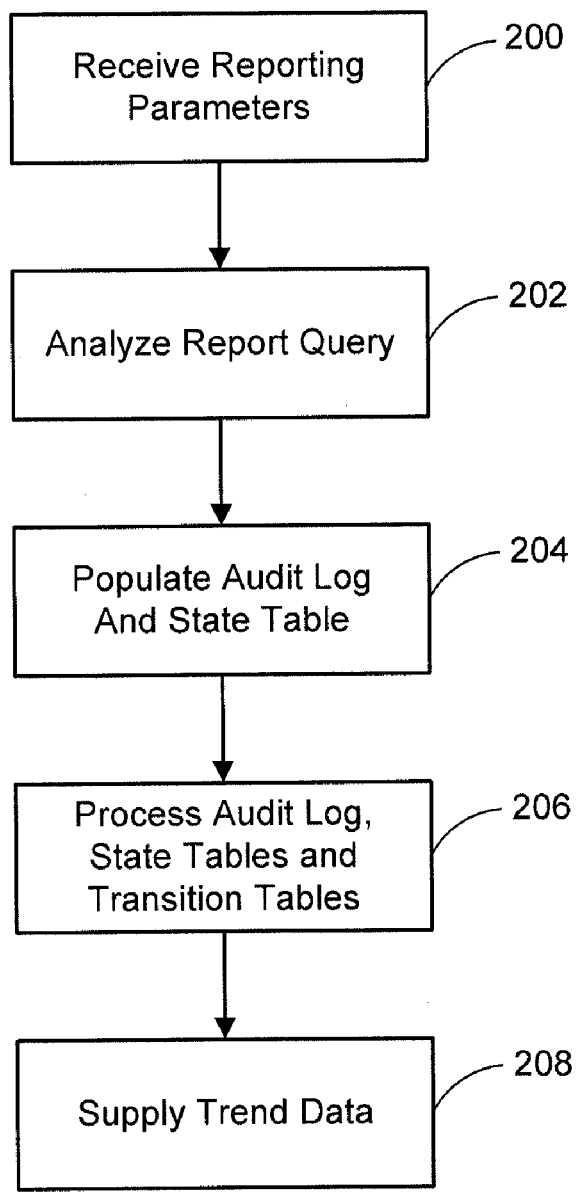
FIG. 2 illustrates processing operations associated with an embodiment of the invention.

FIG. 2 illustrates processing operations associated with the trend analyzer 124. Initially, reporting parameters are received 200. The reporting parameters may include a time period (e.g., the years 2009 through 2010) and frequency (e.g., quarterly) of interest. This information may be supplied by a user interested in a particular value associated with a report.

A query associated with a report is then analyzed 202. Based upon the analysis, a state table and optimized audit log are populated with values 204. To secure the trend data, the optimized audit log, state table and transition tables are processed 206. Thereafter, trend data is supplied 208.

These operations are appreciated in connection with a specific example. In the case of the Employees class discussed above, the associated audit log table is analysed and mappings are created from the fields in this log to the corresponding fields in the optimized audit log.

Figure 3:
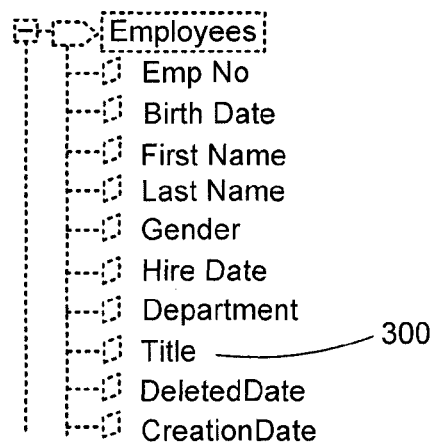
FIG. 3 illustrates a class of objects that may be processed in accordance with an embodiment of the invention.

These optimized log mappings are stored as part of the semantic layer metadata defined by a Universe™ in a system sold by Business Objects™, a division of SAP®, Walldorf, Germany. In such a system, for example shown in FIG. 3, the designer right clicks on the Title object 300 in the Universe, and indicates a desire to create an audit mapping for this field. The system presents the designer with a list of field values associated with the table underpinning the Employees class. A user may also select the audit log table, and then proceed through a wizard that allows one to express mappings to the expected fields in the optimized log.

Now, in order to reconstruct the state of a given record, the changes over time are reversed one-by-one. In order to optimize this replay of records, it would be advantageous if the system could ignore records that will not influence the outcome, e.g. if the report is only interested in pet stores in the state of Nebraska, then only stores which had the location Nebraska would be of interest during the period in question. Not all Nebraskan records are going to be of interest, but it certainly reduces the potential volume of candidate records if this value is used as a filter.

An optimization to the processing operations of FIG. 2 is to focus on one key discriminating column. This discriminator could be identified by carrying out counts on the result sets of a query for each logical predicate in the conjunctions in the WHERE clause (i.e., logical 'AND' criterion) executed in isolation, and choosing the 'AND' condition with the fewest members.

This clause represents the most exclusive criteria, and in turn provides a good candidate for filtering the audit log. This only applies definitively for logical 'AND' conditions as failure to pass a logical 'AND' condition automatically means that the query fails for that member.

For example, consider the following query:

```
SELECT DISTINCT employeeID FROM employees
    WHERE profession='engineer'
      AND nationality='FR' AND
          industry='aerospace';
```

If one wants to view the results of this query over a number of months in a given year, one could filter the audit log to produce a record of employees who were at some point engineers, or French or worked in aerospace. If aerospace is the most exclusive of the three fields, then one can optimize the audit log by only retaining rows which correspond to those employees who at one time worked in aerospace.

When the log is processed to restore an historical view, one can just look at entries relating to this set of employees, thus reducing the number of irrelevant records. While being a worker in the aerospace industry does not guarantee that the other criteria will be met, it provides a good filter to reduce workload.

In a data warehouse, a complete view of all information is recorded and this can be queried along different dimensions to provide different views of data. In the current approach, such a complete data warehouse does not exist. Therefore, the invention reconstructs an historical record for only that data that may be of interest for the report.

This can be done by retrieving rows from the current database state that correspond to the discriminating keys. The query can then be run against these rows to record whether they currently meet the report criteria.

The system can then step back through this known state of the system using the audit log to rewind the database back through the changes that are of interest. This is important, as individual changes taken separately cannot be used to evaluate the result of a multi-clause query; the query needs to know the overall state of the database for that record at that specific time.

Consider a situation where a user is only interested in the statistical changes in the size of a result set over time, rather than tracking the individuals that move in and out of membership. This can be achieved by simply examining each row in the log, and checking if the change it records makes a change to overall membership. Changes can then be recorded by storing the joiner or leaver, and the time at which the transition occurred.

This technique allows one to work back from a known state in the present to calculate historical statistics. Consider the earlier sample query:

```
SELECT DISTINCT employeeID FROM employees
    WHERE profession='engineer'
    AND nationality='FR' AND
        industry='aerospace';
```

If at a previous time, denoted t-n were n=1, 2, 3, ..., a given employee meets these criteria, then the employee will be a member of the result set for that period. If the employee is no longer a member at time t, then it follows that at least one of the three criteria is no longer satisfied.

From a trend analysis point of view, the factor or factors that have changed may be of considerable interest. For example, has the employee been promoted or moved from the country?

In order to track this, a more detailed analysis than simply managing counters is required. It is necessary to store identifiers for all records that either join or leave during the period in question. Individual changes can then be checked against dependent clauses to determine whether they impact on the overall query result, and consequently on members joining or leaving the result set.

For those queries that do have an impact, the user can be given detailed feedback on where they went, or for a given month, a breakdown of the prime origins and destinations.

Consider a human resource database that tracks the grades, locations and industrial sectors of employees. When an employee's status changes for any of these values, an update is made to the employee's record and this is recorded in an audit log. Suppose that the human resource director wants to track the number of engineers based in France on a month-by-month basis over the last year. More particularly, the director wants to produce a report that breaks this group down by industrial sector. In one embodiment, a query, can be defined in Web Intelligence™, which produces a standard report. One can then select the aerospace sector, and request an historical analysis for this specific value.

The system now has a three-part query defining the measure to be tracked, that is (1) engineers (2) in France working (3) in aerospace. The invention identifies that the most discriminating value is aerospace, and moves on to generate an optimized log that only includes changes for records that had the value aerospace at some stage during the year.

The system calculates the current total number of engineers that meet the criteria, 100 say, and begins to rewind the log month by month. It also produces a table of current members that can be used to record state on a month-by-month basis, with every log entry this table can be updated allowing queries to be executed in a state aware manner.

Figure 4:
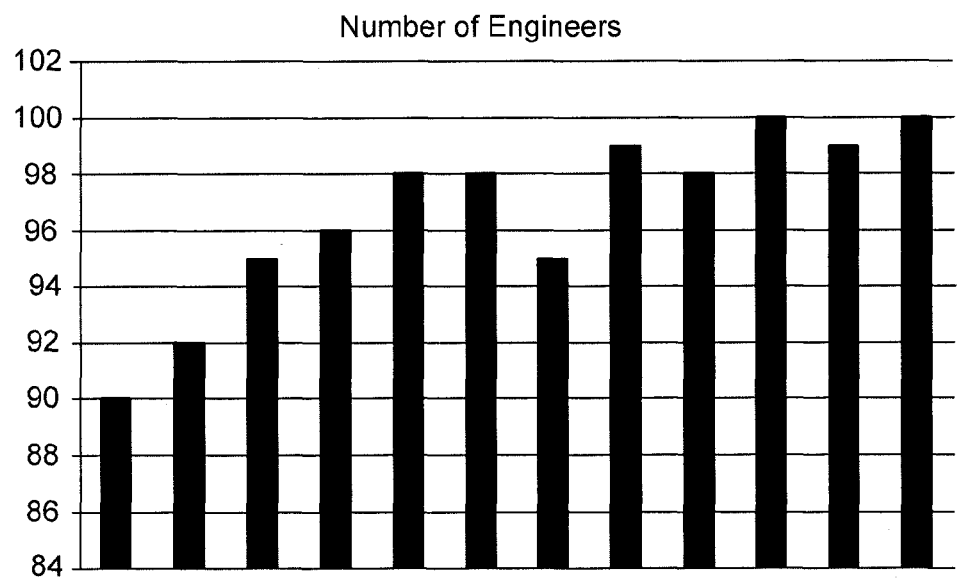
FIG. 4 illustrates a report that may be constructed in accordance with an embodiment of the invention.

Suppose that in the month of December, 1 engineer left and 2 joined, this brings the total at the end of November down to 99. The system records the individual leavers and joiners, and then moves back to rewind November, and so on. This produces a graph of membership, such as shown in FIG. 4, where column 400 represents November. The director can then take the leavers in a given month, April say, and can identify that 1 moved to senior engineer and the other left the company entirely.

A number of data resources are needed to support this. Tables to store transition records (e.g., Leaver and Joiner) are created, for example, with the following structure:

| Transaction ID | Record ID | Date |
|---|---|---|

The Transaction ID corresponds to the entry in the log, the Record ID is the primary key for the changed record and the time value corresponds to the modified date in the log. These tables are populated as part of the rewind process. The rewind process is focussed on providing a structured, stateful step back through the log.

Returning to FIG. 2, report parameters are received 200, such as a preferred time period and frequency. The query associated with the report is then analyzed 202. In particular, the query is analyzed to identify any data that needs to be retrieved from the database. The analysis also includes an evaluation of the individual WHERE clauses, and note is taken of how these clauses relate to one another, i.e. are they logical ANDs, ORs or more complex nested subclauses.

The output of this analysis is a view of the query separated into the individual interdependent clauses. This can be used later to relate a change in a given column to the overall state of the query for that changed row.

Embodiments of the invention provide a view of how a particular quantity changes over time. This means that for any given moment during the period being reviewed, the system needs to know the state of the data in the system for that point in time.

To support this, a state table is used to track only the data identified in the analysis of the query. The original query can then be transformed such that it applies to those columns in the state table, while preserving the relationships and hierarchies within the original query.

In this scenario, the state for a given row can be reevaluated when a log entry for that row is reversed—that is, an individual column value is returned to the state held prior to the logged update event.

This state table must also store the overall state of the row so that changes in the overall result of the query can be evaluated. This binary field reflects whether at any time t the record represented by that row in the state table was a valid member of the result set for the query. This field can be used to evaluate whether a change in a given column causes a change to the overall state of the row. If a change to the state table causes this value to change from true to false, or vice versa, then this event can be recorded.

Not all records in the database are going to be of interest, so it is beneficial if a mechanism is used to reduce the number of records that need to be examined in the database, and also in the log. In order for a record to qualify as a potential candidate for processing, it follows that there must have been a possibility for it to pass the query at some point during the period under review.

This is addressed by finding which query clause is the most discriminating, and then identifying records that at some stage held the correct value. A discriminating clause is one which produces the smallest result set when executed in isolation against the audit log. This discrimination mechanism involves executing the following query for each clause value:

```
SELECT COUNT(1) FROM audit_log
    WHERE newValue=<clause value>;
```

The newValue column is used as this stores the fact that at some stage the record held this value, including when new records were created. Once the discriminating column has been identified, a key set for the rows with this value can be created.

The key set from this discrimination analysis can be used to find all records that are of interest in the log, and these can be inserted into a new optimized log table. Similarly, the key set can be used to evaluate the current state of these records in the live system, and this can be used to populate the state table.

This approach also facilitates parallel processing. Given that the current state of a record is entirely dependent on a deterministic set of events recorded in the log, then it follows that any key in the key set can be used to retrieve the current state of the corresponding record, and a complete set of changes in the log representing all of the modifications to that record over time.

As such, that individual record's state can be rewound in isolation without compromising the integrity or accuracy of the record at any point during the rewind. Similarly, the key set can be divided into arbitrary subsets and these can be used to rewind records in parallel.

In addition to the records in the audit log, the optimized log also needs to ensure that deletes and inserts are recorded. As noted previously, the object Universe should already indicate where timestamps for these events can be sourced. These events need to be interleaved with other audited events in the optimized log. The pre- and post-values are set to INSERT or DELETE accordingly for these events.

Each step in the optimized log can now be examined in reverse order starting with the most recent change. As each log entry identifies the table name, field and its pre- and post-values, they can be used to retrieve the relevant query clauses. These clauses can then be executed for the pre-change value. If this produces a different outcome from that currently stored in the state table, the system then moves on to re-compute the overall state of the record including this new value. This will result in a pass or a fail for the overall query. If this outcome differs from the current query state, then a note can be taken of the fact that the change represents a transition (e.g., a leaver or a joiner)

Where an insert or delete event occurs, these can be rewound by changing the value of the active field for the row concerned: reversing an insert changes the active column to false, while deletes are reversed making records active again.

At this point, the system has detailed information on result set membership across the time period being reviewed. The system can now use this information to present this historical information according to whatever frequency (daily, weekly, monthly, etc.) the user wants. The user can also change this frequency without requiring a further rerun of the trend analyzer, as the transition tables store the dates at which the leaving or joining event occurred.

The transition information can also be combined with the corresponding transactions in the log to identify why the user left or joined the set. This could provide useful information for a performance management system.

Consider the query used previously:

```
SELECT DISTINCT employeeID FROM Employees
    WHERE profession='engineer'
    AND nationality='FR' AND
        industry='aerospace';
```

This query is first processed to identify the various clauses. In this case, there are three clauses, and they have a logical AND relationship.

The analysis of the query results in the optimized log of FIG. 5. The audit log of FIG. 5 specifies a transaction ID, a record ID, a table name, a field name (object name), an old value, a new value and a modification date. Observe that each data change at the data source (e.g., an old value, a new value) corresponds to a query clause (e.g., profession, nationality or industry).

A corresponding state stable is shown in FIG. 6. The state table contains the following entries for the query clauses:

$C_1$—profession='engineer'
$C_2$—nationality='FR'
$C_3$—industry='aerospace'

In other words, the state table includes a column for each of the data clauses (objects) identified in the query. In addition, the state table specifies a record ID, the state of the condition, and whether the record is currently active. The State column stores the condition of that row with regard to the result of the query.

At this point, the optimized audit log of FIG. 5 and the state table of FIG. 6 are processed by the trend analyzer 126. At time t, the total population of the result set is 2. Taking the most recent entry in the log, rewinding it results in the state table of FIG. 7. The change in State from '1' to '0' (as shown with block 700) reflect change to Profession (block 702). The State change means that at the time of transaction 1, record 1 was a joiner to the set. This means an entry needs to be added to a transition table (i.e., a Joiners table) for that date, which is shown in FIG. 8. The transition table of FIG. 8 specifies a transaction ID, a record ID and a time. The transition table associates a temporal value with a data change at the data source that impacts the result produced by the query.

Moving to the next most recent log entry, transaction 2 of the audit log of FIG. 5, the state table needs to be changed as shown at block 900 of FIG. 9. The change of nationality from UK back to FR results in the value in the Nationality column, but it has no overall effect on the State value in the table of FIG. 9 as employee 2 is not in the aerospace industry.

Transaction 3 of the optimized audit log of FIG. 5 has no effect, as shown in the state table of FIG. 10. Transaction 4 from the audit log of FIG. 5, representing a promotion, produces the state table of FIG. 11. This State change from '0' to '1' (as shown with block 1100) reflects new value Manager (block 1102). The State change indicates a leaver so the transition table (i.e., the Leaver table) of FIG. 12 is updated to indicate the transaction ID, record ID and time.

The trend analyzer 126 is now in a position to supply the trend data shown in FIG. 13. The trend data includes a time entry, an employee population value and transition information (i.e., Leavers and Joiners). One can then use the data in the Leaver and Joiner tables of FIGS. 8 and 12 to identify that the leaver at time t-2 was due to a promotion from Engineer to Manager, as shown in the audit log of FIG. 5, and the joiner at t was also due to a promotion from Assistant Engineer to Engineer, as shown in the audit log of FIG. 5.

Those skilled in the art will recognize a number of advantages associated with the invention. First, there is no need to create dedicated data warehouses to secure trend information. The queries used to create time dependent reports can be easily changed or extended without requiring expert re-engineering of the data sources. This allows for a more agile approach to report design and access to more live or nearly-live data.

An embodiment of the present invention relates to a computer storage product with a computer-readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A method for supply trend data from data sources not having a specified time dimension, the method being implemented by one or more data processors and comprising:
analyzing, by at least one data processor, a query associated with a report to identify interdependent query clauses, wherein the query is applied against a data source that does not have a specified time dimension, wherein the report is part of a business intelligence system that automatically retrieves information from at least one data source and structures the retrieved information in accordance with a report schema, wherein the forming, by at least one data processor, an audit log to store data changes at the data source and temporal values associated with the data changes;
constructing, by at least one data processor, a state table to track only data identified in the analysis of the query associated with the report;
recording, by at least one data processor, the value of the data required by each query clause into the state table and record states of each row of the state table;
processing, by at least one data processor, records in the audit log by reverse temporal order and by modifying the content of the state table to produce updated state tables;
identifying, by at least one data processor, data changes at the data source that impact a result produced by the query;
deriveing, by at least one data processor, transition tables from the updated state tables to associate temporal values with the data changes at the data source that impact a result produced by the query, the transition tables being different than the updated state tables; and
supplying, by at least one data processor, trend data derived from the transition tables to generate the report as time-dependent, wherein a user can change a frequency for the trend data in the report using the transition tables.

2. The method of claim 1 wherein the audit log is an optimized audit log specifying an object name and a table name associated with a data change corresponding to a query clause.

3. The method of claim 1 wherein the audit log is an optimized audit log specifying a transaction ID, a record ID, an old value and a new value associated with a data change.

4. The method of claim 1 wherein the state table stores a Boolean value for a query result's state.

5. The method of claim 1 wherein the state table specifies whether a row of the state table is currently active.

6. The method of claim 1 wherein the state table specifies a record ID.

7. The method of claim 1 wherein each transition table specifies a transaction ID, a record ID and a temporal value.

8. The method of claim 1 wherein the trend data specifies a time and a transition event.

9. The method of claim 8 wherein the transition event represents data changes at the data source that impact a result produced by the query.

10. The method of claim 1 wherein processing records comprising processing records in the audit log by examining only the rows of the audit log corresponding to a most discriminating query term in the data source.

11. The method of claim 1 further comprising receiving reporting parameters.

12. The method of claim 11 wherein the reporting parameters include a time period and frequency of interest.

13. The method of claim 11 wherein the data source is a transactional database.

* * * * *